United States Patent Office 3,558,713
Patented Jan. 26, 1971

3,558,713
PHENYL AND NAPHTHYL SUBSTITUTED ALKYL
Eugene J. Miller, Jr., Wheaton, Harlan E. Tiefenthal, Western Springs, and Richard A. Reck, Hinsdale, Ill., and Robert E. Malec, Birmingham, Mich., assignors to Armour Industrial Chemical Company, Chicago, Ill., a corporation of Delaware
No Drawing. Filed Sept. 23, 1968, Ser. No. 761,856
Int. Cl. C07c 49/76, 49/82
U.S. Cl. 260—590         9 Claims

ABSTRACT OF THE DISCLOSURE

Arylaliphatic ketones having the formula

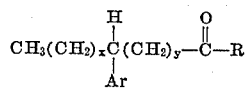

wherein Ar is an aromatic group, $x$ is an integer from 0 to 18, $y$ is an integer from 1 to 19, and the sum of $x$ and $y$ is an integer from 8 to 19 and R is selected from the group consisting of normal-alkyl radicals having from 1 to 4 carbon atoms, an aromatic group, and

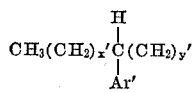

wherein $x',y'$ and Ar' are selected from the groups defined under $x$, $y$ and Ar respectively.

The arylaliphatic ketones of this invention are especially useful as synthetic lubricants.

BACKGROUND OF THE INVENTION

Previously available ketones have not proved entirely satisfactory for all uses such as synthetic lubricants. For example, alkylaryl ketones such as stearophenone exhibit a melting point too high for use as synthetic lubricants. Likewise, lower-alkyl ketones such as methylheptadecyl ketone also exhibit too high melting point for use as synthetic lubricants. Prior ketones having aromatic groups, which are desired to achieve plating properties, have had a structural configuration such that the aromatic group was conjugated with the carbonyl group, thus decreasing the effect of the aromatic group.

DESCRIPTION OF THE INVENTION

We have discovered a class of ketones having at least one aromatic group in the ketone molecule which cannot be conjugated to the carbonyl group. The ketones of our invention display excellent properties as components of synthetic lubricants, or as synthetic lubricants by themselves.

The compounds of our invention may be described by the following general formula

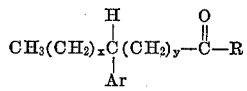

wherein Ar is an aromatic group; $x$ is an integer from 0 to 18; $y$ is an integer from 1 to 19; the sum of $x$ and $y$ is an integer from 8 to 19; and R is selected from the group consisting of normal-alkyl radicals having from 1 to 4 carbon atoms, an aromatic group, and

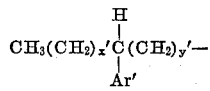

wherein $x'$, $y'$ and Ar' are selected from the groups defined under $x$, $y$ and Ar respectively.

A preferred class of aromatic groups for Ar, Ar' and R include mono- and dicarbocyclic groups and mono- and dicarbocyclic groups substituted with one to two radicals selected from the group consisting of methyl, methoxy, phenoxy and hydroxy groups. An especially preferred sub-class of aromatic groups includes the monocarbocyclic group selected from phenyl and phenyl substituted with from one to two radicals selected from the group consisting of methyl, methoxy, phenoxy, and hydroxy. Another preferred subclass includes the dicarbocyclic group selected from naphthyl and naphthyl substituted with from one to two radicals selected from the group consisting of methyl, methoxy, phenoxy, and hydroxy. Preferred substituted groups include tolyl, anisyl, hydroxyphenyl, phenoxyphenyl, resorcyl, cresyl, xylyl, dimethoxyphenyl, methyl naphthyl, methoxy naphthyl, hydroxy napththyl, dimethyl anthracyl and methyl anthracyl.

It is preferred that the R group, when a lower alkyl group, be selected from the group consisting of methyl, ethyl, n-propyl and n-butyl. When the R group is an aromatic group, it may preferably be selected from the preferred classes of aromatic groups set forth above. An R aromatic group may be the same as or different from the Ar or Ar' aromatic group attached to the secondary-alkyl group. When R is an arylalkyl group, the arylalkyl group may be the same as the arylalkyl group on the opposite side of the carbonyl group, that is, the molecule may be symmetrical or the two arylalkyl groups may be different and unsymmetrical with respect to the aryl group, position of the aryl attachment to the secondary-alkyl group, and the chain length of the alkyl groups may be different.

In one preferred embodiment of our invention, at least one arylalkyl group is derived from oleic acid resulting in an arylheptadecyl ketone. Phenylheptadecyl ketones and naphthylheptadecyl ketones including methyl phenylheptadecyl and methyl naphthylheptadecyl ketones are especially preferred for certain applications.

The ketones of our invention are formed by the reaction of an arylaliphatic acid with a lower normal-alkyl carboxylic acid, an arylalkyl carboxylic acid, or an aromatic carboxylic acid.

As shown in the foregoing formulae, the secondary-alkyl carbon to which an aryl group is attached varies with the respective values of $x$ and $y$. With unsaturated alkenyl chains, such as oleyl, under most reaction conditions the double bond migrates up and down the carbon chain (isomerization by hydrogen ion transfer) resulting in a mixture of isomeric products. In arylating oleyl, there is a tendency for the $C_8$–$C_{14}$ and the $C_{17}$ aryl isomers to predominate, but smaller mole percentages of other isomers such as the $C_6$, $C_7$, $C_{15}$ and $C_{16}$ isomers are formed. The mole percent of the $C_2$–$C_5$ isomers is usually quite small or even negligible. The relative proportion of the various isomers may vary depending upon the arylation process. See J. Org. Chem. 30, 885–888 (1965). However, the chain length represented by the total of $x$ and $y$ will remain constant such as 15 for oleyl, 8 for undecyl and 19 for behenyl. By arylation, oleic acid is converted to aryl-substituted stearic acid, the greatest individual components in the case of phenylation being 9(10)-phenylstearic acid. Similarly, palmitoleic, erucic, 10-undecanoic acids can be converted to the corresponding aryl-substituted carboxylic acids. Commercial grade oleic acid contains myristoleic, palmitoleic, linoleic and linolenic acids, and therefore a mixture of corresponding aryl-substituted acids are obtained by arylation.

A satisfactory method for producing arylaliphatic acid reactants for use in this invention is disclosed in copending U.S. patent application Ser. No. 679,251, filed Oct. 30, 1967, "Process for Mono-Alkylation of Aromatic Compounds."

The arylaliphatic ketones of our invention may be produced by the reaction of an arylaliphatic carboxylic acid with a lower normal-alkyl carboxylic acid, an arylaliphatic carboxylic acid or an aromatic carboxylic acid by contacting the arylaliphatic carboxylic acid with the other acid reactant in the vapor phase in the presence of a metallic oxide catalyst such as magnesium oxide, calcium oxide, and thorium oxide at elevated temperatures and sub-atmospheric pressures. Suitable temperatures are from about 250° to 400° C. Preferred temperatures are from about 325° to 375° C. Suitable pressures are from about 50 to 200 mm. Preferred pressures are from about 75 to 150 mm. The stoichiometry of the reaction calls for a 1:1 molar ratio of acids. It is preferred to use a molar excess of the lower molecular weight acid when producing unsymmetrical ketones. From about 2 to 8 moles of the lower molecular weight acid per mole of arylalkyl acid being especially preferred. The symmetrical ketone formed from the excess of lower molecular weight acid may be removed from the desired product by fractional distillation. Further details of suitable processes are discussed in "Fatty Acids and Their Derivatives," A. W. Ralston, John Wiley & Sons, Inc., 1948, pages 834–835.

The arylaliphatic aromatic ketones of our invention may be advantageously prepared by the process of reacting an arylaliphatic acid with an aromatic compound in a hydrogen fluoride catalyst-media. In this process, a liquid phase reaction, an arylaliphatic acid, aromatic compound, and hydrogen fluoride are added to a reaction vessel and stirred until the reaction is substantially complete. It is preferred the aromatic compound be in a molar excess, on the basis of the arylaliphatic acid. From about 2:1 to 8:1 is suitable. From about 10 to 100 moles of substantially anhydrous liquid hydrogen fluoride per mole of arylaliphatic acid is suitable. A preferred molar ratio is from about 30 to 80 moles of hydrogen fluoride per mole arylaliphatic acid. It is preferred to perform the reaction at elevated temperatures, from about 40° to 150° C. being preferred. In a batch reactor the reaction is complete in from a few minutes to a few hours, depending upon the proportions of reactants and temperature. This reaction is especially suitable for continuous process plant operation since the hydrogen fluoride may be readily distilled and recycled. The excess aromatic reactant may also be readily removed from the product by distillation and also recycled back to the reaction chamber providing an extremely efficient process system.

The ketones of our invention have shown good properties for use as synthetic lubricants. The high molecular weight ketones are good lubricants and have good thermal, oxidative and hydrolytic stability. The ketones of this invention having a structural configuration such that at least one aromatic group is not conjugated with the carbonyl group affords maximum effect of the aromatic group. A preferred sub-class of compounds of our invention suitable for use as synthetic lubricants are the arylaliphatic short chain alkyl ketones. Especially preferred ketones are selected from the group consisting of xylyl xylyheptadecyl, methyl phenylheptadecyl and methyl tolylheptadecyl ketone.

The process for lubrication and protection of metal surfaces according to our invention comprises contacting said surfaces with an amount effective to produce desired lubrication and protection of an arylaliphatic ketone of our invention. The arylaliphatic ketones may be used as a lubricant base in conjunction with other additives such as antioxidants. The arylaliphatic ketones may be used as lubricants alone or in conjunction with suitable solvent systems. The amount of lubricant required to obtain desired lubrication varies dependent upon the metals involved, the surfaces involved, and environmental conditions.

The following examples are presented to illustrate the present invention.

Example I

Phenylstearic acid was prepared by arylation of commercial grade oleic acid with benzene in a hydrogen fluoride media. A mixture of phenylstearic acid (N.E. 351, calc'd 360, 81.3% phenylstearic acid, 721.0 grams, 2.0 moles) and acetic acid (480.0 grams, 8.0 moles) was passed, in the vapor phase, at 100 mm. pressure, through a column packed with about 1200 grams of MgO at about 360–375° C. The effluent product was dissolved in ether and washed with dilute caustic to remove any traces of free acid, then washed with water until the washings were neutral. The ether solution was dried over anhydrous sodium sulfate and stripped in vacuo to yield 586.6 grams (81.7%) of crude methyl phenylheptadecyl ketone. Additional stripping on a molecular still removed essentially all traces of non-arylated methyl alkyl ketones. The Acid Value of the product was nil, less than 1. Infrared analysis showed strong ketone absorption. Absorption bands were observed at 5.82 and 8.62 microns identifying a methyl alkyl ketone; at 6.24 and 6.69 microns confirming the presence of an aromatic ring; and at 13.17 and 14.32 microns confirming mono-substitution of the aromatic structure.

Example II

The same apparatus, procedure, and conditions were used as in Example I, except tolylstearic acid (N.E. 346; calc'd 375; 751.0 grams, 2.0 moles) was substituted for phenylstearic acid used in Example I. The reaction yielded 610.0 grams (82.2%) of crude methyl tolylheptadecyl ketone. The Acid Value of the product was nil, less than 1. Infrared analysis showed strong ketone absorption. Absorption bands were observed at 5.82 and 8.62 microns identifying a methyl alkyl ketone; at 6.23, 6.61 and 6.71 microns confirming the presence of an aromatic ring; and bands at 12.78, 13.22 and 14.22 microns confirming ortho, meta and para di-substituted aromatic rings.

Example III

The same apparatus, procedure, and conditions were used as in Example I, except xylylstearic acid (N.E. 372, cal'cd 386; 779.0 grams, 2.0 moles) was substituted for phenylstearic acid used in Example I. The reaction yielded 669.0 grams (86.3%) of crude methyl xylylheptadecyl ketone. The Acid Value of the product was nil, less than 1. Infrared analysis showed strong ketone absorption. Absorption bands were observed at 5.82 and 8.62 microns identifying a methyl alkyl ketone; at 6.22 and 6.65 microns confirming the presence of an aromatic ring; and at 11.47 and 12.25 microns confirming 1,2,4-tri-substituted aromatic ring structure.

Example IV

Using the apparatus and general procedure as in Example I, anisylstearic acid (N.E. 421, cal'cd 391; 750.7 grams, 1.79 moles) was mixed with acetic acid (432 grams, 7.2 moles) and passed through a column of about 1200 grams MgO at 345,370° C. at 100 mm. pressure. The product was isolated and purified in the same fashion as Example I yielding 592.0 grams (77.5%) of crude methyl anisylheptadecyl ketone as a dark liquid. The Acid Value of the product was nil, less than 1. Infrared analysis showed strong ketone absorption. Absorption bands were observed at 5.82 and 8.53 microns identifying a methyl alkyl ketone; at 6.25, 6.61 and 6.70 microns indicating the presence of the aromatic structure; and at 12.08 and 13.32 microns indicating ortho and para di-substituted aromatic structures; and at 8.05 and 9.67 microns indicating the presence of an alkylaryl ether.

Example V

Using the apparatus and general procedure as in Example I, phenoxyphenylstearic acid (N.E. 473, calc'd 452.7; 770 grams, 1.63 moles) was mixed with acetic acid (394 grams, 6.54 moles) and passed through a column containing about 1200 grams of MgO at 340365° C. at 60–75 mm. pressure. The product was isolated and purified in the same fashion as Example I yielding 578.2 grams (77.0%) of crude methyl phenoxyphenylheptadecyl ketone. The Acid Value of the product was nil, less than 1. Infrared analysis showed strong ketone absorption. Absorption bands were observed at 5.82 and 8.59 microns identifying a methyl alkyl ketone; at 6.28, 6.64 and 6.71 microns indicating the presence of an aromatic structure; at 11.9 microns indicating the presence of a para di-substituted aromatic structure; at 13.32 and 14.59 microns indicating the presence of mono-substituted aromatic structure; and at 8.09 microns indicating a diaryl ether.

Example VI

A one liter Monel autoclave was charged with 400 ml. (400 grams, 20 moles) of liquid anhydrous hydrogen fluoride. A solution of 186 grams (0.5 mole) of xylylstearic acid in 221.4 grams (2.0 moles) of xylene was added to the hydrogen fluoride at about 0° C. The reactor was sealed and the temperature raised to about 90–100° C. for 4 hours at autogenous pressure. The reactor contents were then cooled to about 20° C. and pressured out of the reactor into about 2 liters of cold water. Ether was added and the aqueous acid phase separated. The ether solution was then washed with water until the washings were neutral. The ether solution was dried over anhydrous sodium sulfate and stripped in vacuo to yield 222.0 grams (96.8%) of crude xylylheptadecyl xylyl ketone as a dark oil. The crude product had an acid value of 15.1 corresponding to about 10.5% free xylylstearic acid remaining in the crude product. Infrared analysis showed strong ketone absorption. A band at 5.96 microns established the presence of an alkyl aryl ketone; and bands at 6.24, 6.40 and 6.67 microns indicated the presence of aromatic structures; and 1,2,4-tri-substituted aromatic rings are indicated by a complex absorption band structure.

Example VII

A 300 ml. autoclave was charged with 142.0 grams (0.4 mole) of phenylstearic acid and 7.1 grams (5 percent by weight) of iron powder. The reactor was sealed and the temperature raised to about 310° C. for 7 hours. The reactor pressure ranged from 75 to 135 p.s.i.g. with periodic venting down to 25 p.s.i.g. to remove $CO_2$ and water formed during the reaction. The reactor contents were then cooled and passed through a pressure filter using Celite Filter Aid. The product, crude diphenylheptadecylketone, was obtained as a dark oil in a yield of 102.6 grams (79.5% crude mass yield). The crude product had 2.4 percent unreacted phenylstearic acid. Infrared analysis showed strong ketone absorption. A band at 5.82 microns established the presence of a dialkyl ketone; bands at 6.23 and 6.67 microns indicated the presence of the aromatic structure; and bands at 13.15 and 14.30 microns indicated the presence of a mono-substituted aromatic ring.

EXAMPLE VIII

Xylylheptadecyl xylyl ketone was tested as a lubricant in a Falex Wear Tester. In the Falex Wear Tester two V blocks are forced against a rotating shaft, the load being applied by pressing the shaft against the sides, and the torque being measured with regard to the rotating shaft while the entire test portion of the apparatus is immersed in the lubricant tested. Operating the Falex Wear Tester at a 250 pound load for 5 minutes submerged in xylylheptadecyl xylyl ketone showed there was no change in torque over the test period; and using a 500 pound load for 5 minutes the torque increased from 11 at the start to 16 at the end of the time period. Although the temperature of the materials reached about 350° F. during the test, little or no degradation of xylylheptadecyl xylyl ketone was observed.

Example IX

Oxidation corrosion tests were conducted at 500° F. for 48 hours using methyl phenylheptadecyl ketone. In a vessel containing methyl phenylheptadecyl ketone were placed metal specimens as noted in Table I. Air was bubbled through the ketone throughout the entire test at the rate of 1½ liters per hour. The metal specimens used were prepared by special polishing as recommended by Federal Specification 5308.4, Oxidation-Corrosion Test. The coupons were preweighed to the nearest mg. and placed on a specially prepared tube to hold them in place. The tube and metal to be tested were then submerged in 150 ml. of the ketone and the container tightly closed. The ketone was heated to 500° F. and maintained at that temperature for 48 hours. At the end of the time interval, the coupons were removed, rinsed first in hot benzene and then in hot chloroform, and finally in hot acetone to air dry them. The metal specimens were then weighed to the nearest mg. The results are shown in Table I.

TABLE I

| Test metal: | Weight change in grams |
|---|---|
| Aluminum | 0.0000 |
| Copper | 0.0000 |
| Steel | 0.0000 |
| Silver (loss) | 0.0002 |
| Cadmium (gain) | 0.0002 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:
1. Arylaliphatic ketones having the formula:

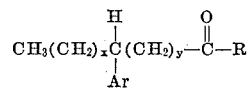

wherein Ar is selected from the group consisting of phenyl, naphthyl, and phenyl- and naphthyl-substituted with from 1 to 2 radicals selected from the group consisting of methyl, methoxy, phenoxy and hydroxy; $x$ is an integer of 0 to 18, $y$ is an integer of 1 to 19, and the sum of $x$ and $y$ is an integer of 8 to 19; and R is selected from the group consisting of normal-alkyl radicals having from 1 to 4 carbon atoms, an aromatic radical selected from the group consisting of phenyl, naphthyl, and phenyl- and naphthyl-substituted with 1 to 2 radicals selected from the group consisting of methyl, methoxy, phenoxy and hydroxy, and

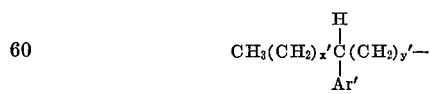

wherein $x'$, $y'$ and $Ar'$ are selected from the groups defined for $x$, $y$ and Ar respectively.

2. Arylaliphatic ketones of claim 1 wherein Ar is selected from the group consisting of phenyl and phenyl-substituted with from one to two radicals selected from the group consisting of methyl, methoxy, phenoxy and hydroxy.

3. Arylaliphatic ketones of claim 1 wherein R is selected from the group consisting of methyl, ethyl, n-propyl and n-butyl.

4. Arylaliphatic ketones of claim 1 wherein R is selected from the group consisting of phenyl, naphthyl and phenyl and naphthyl groups substituted with from one to two radicals selected from the group consisting of methyl, methoxy, phenoxy and hydroxy groups.

5. Arylaliphatic ketones of claim 1 wherein R is

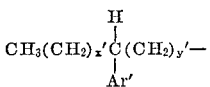

wherein $x'$, $y'$ and $Ar'$ are selected from the groups defined under $x$, $y$ and $Ar$ respectively.

6. Arylaliphatic ketones of claim 1 wherein R is methyl.

7. Arylaliphatic ketones of claim 1 wherein the sum of $x$ and $y$ is 15.

8. Arylaliphatic ketones of claim 1 selected from the group consisting of methyl phenylheptadecyl ketone, methyl tolyheptadecyl ketone, methyl anisyheptadecyl ketone, di-phenylheptadecyl ketone and xylylheptadecyl xylyl ketone.

9. Arylaphatic ketones having the formula

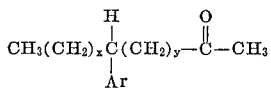

wherein Ar is selected from the group consisting of phenyl and phenyl substituted with one to two radicals selected from the group consisting of methyl, methoxy, phenoxy and hydroxy, $x$ is an integer of 0 to 18, $y$ is an integer of 1 to 19, and the sum of $x$ and $y$ is an integer of 8–19.

References Cited

UNITED STATES PATENTS

| | | | |
|---|---|---|---|
| 2,612,524 | 9/1952 | Zettlemoyer et al. | 260—590 |
| 2,697,729 | 12/1954 | Ohlson et al. | 260—590 |
| 2,857,428 | 10/1958 | Ardis et al. | 260—590 |

DANIEL D. HORWITZ, Primary Examiner

U.S. Cl. X.R.

252—52